US009297886B1

(12) United States Patent
Mountcastle et al.

(10) Patent No.: US 9,297,886 B1
(45) Date of Patent: Mar. 29, 2016

(54) SPACE TIME ADAPTIVE TECHNIQUE FOR SUPPRESSION OF SPACEBORNE CLUTTER

(71) Applicant: Lockheed Martin Corporation, Bethesda, MD (US)

(72) Inventors: Paul D. Mountcastle, Moorestown, NJ (US); Mark A. Friesel, Ewing, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 563 days.

(21) Appl. No.: 13/795,817

(22) Filed: Mar. 12, 2013

(51) Int. Cl.
  *G01S 7/292* (2006.01)
  *G01S 13/52* (2006.01)
  *G01S 13/524* (2006.01)
  *G01S 7/00* (2006.01)
  *G01S 13/00* (2006.01)

(52) U.S. Cl.
  CPC .......... *G01S 7/292* (2013.01); *G01S 13/52* (2013.01); *G01S 13/5244* (2013.01)

(58) Field of Classification Search
  CPC ............ G01S 7/02; G01S 7/28; G01S 7/285; G01S 7/292; G01S 7/48; G01S 7/483; G01S 7/486; G01S 7/487; G01S 13/66; G01S 13/74; G01S 13/76; G01S 13/78; G01S 17/66; G01S 13/50; G01S 13/52; G01S 13/522; G01S 13/524; G01S 13/5244
  USPC .......... 89/1.11; 382/100, 103; 342/13–20, 27, 342/28, 89–103, 104–115, 159–164, 175, 342/176, 179, 192–197, 118, 128–147
  See application file for complete search history.

(56) References Cited

U.S. PATENT DOCUMENTS

| 4,128,837 | A | | 12/1978 | Page | |
|---|---|---|---|---|---|
| 4,308,538 | A | * | 12/1981 | Albersheim | 342/95 |
| 4,817,495 | A | * | 4/1989 | Drobot | 89/1.11 |
| 5,798,942 | A | | 8/1998 | Danchick et al. | |
| 5,960,097 | A | | 9/1999 | Pfeiffer et al. | |
| 6,043,867 | A | | 3/2000 | Saban | |
| 6,801,155 | B2 | * | 10/2004 | Jahangir et al. | 342/90 |
| 6,877,691 | B2 | * | 4/2005 | DeFlumere et al. | 89/1.11 |
| 6,952,178 | B2 | * | 10/2005 | Kirscht | 342/107 |

(Continued)

OTHER PUBLICATIONS

Paul D. Mountcastle, Nathan A. Goodman, and Charles J. Morgan, "Generalized Adapative Radar Signal Processing", Technology Service Corporation Trumbull, CT, 06611; ECE Dept., University of Arizona, Tucson, AZ, 85721, US Army Space and Missile Defense Command and the Missile Defense Agency under STTR contract HQ0006-07-C-7661, Dec. 2008.

(Continued)

*Primary Examiner* — Bernarr Gregory
(74) *Attorney, Agent, or Firm* — Howard IP Law Group, PC

(57) ABSTRACT

A method for suppressing clutter when detecting objects of interest in a radar system is provided. The method includes defining a plurality of scatterer classes corresponding to a plurality of predetermined scatterer motion types, at least one of the classes corresponding to ballistic acceleration, and at least one of the classes corresponding to non-ballistic acceleration. A plurality of sensor pulses are transmitted, and reflected return pulses are received. Scatterers identified in the radar return signal are associated with one of the scatterer classes. A set of complex weights is generated and applied to the radar return signal data to null scatterers associated with the class corresponding to ballistic acceleration.

16 Claims, 7 Drawing Sheets

(56) References Cited

U.S. PATENT DOCUMENTS

| | | |
|---|---|---|
| 6,995,705 B2 | 2/2006 | Bradford et al. |
| 7,046,188 B2 | 5/2006 | Zaugg et al. |
| 7,295,149 B1 | 11/2007 | Wolf |
| 7,333,047 B2 | 2/2008 | Fullerton et al. |
| 7,394,047 B1 | 7/2008 | Pedersen |
| 7,473,876 B1 | 1/2009 | Pedersen et al. |
| 7,511,252 B1 | 3/2009 | Pedersen et al. |
| 7,755,011 B2 | 7/2010 | Lam et al. |
| 7,924,213 B2 | 4/2011 | De Waard et al. |
| 8,115,148 B1 * | 2/2012 | Boardman et al. ............ 89/1.11 |
| 8,229,163 B2 | 7/2012 | Coleman et al. |
| 8,358,238 B1 * | 1/2013 | Friedman ...................... 89/1.11 |
| 8,416,118 B1 * | 4/2013 | Nuthalapati ................... 342/13 |

OTHER PUBLICATIONS

Kelly, E. J., "The Radar Measurement of Range, Velocity and Acceleration", IRE Transactions of Military Electronics, pp. 51-57, Apr. 1961.

* cited by examiner

SPACE TIME ADAPTIVE TECHNIQUE FOR SUPPRESSION OF SPACEBORNE CLUTTER

FIELD OF THE INVENTION

The present invention relates to signal processing systems used in radar systems, and more particularly, to systems and methods for clutter cancellation in these systems.

BACKGROUND

Remote sensing systems, such as radar systems used to detect the presence, position, speed and/or other characteristics of objects, are vital to both civilian and military operations. These systems utilize electromagnetic (EM) waves to detect and classify, for example, precipitation and natural/man-made objects. In operation, these systems typically transmit "beams" or signals toward targets, and process reflected return signals (or echoes) for target identification and characterization. The presence of clutter in these return signals creates a significant technical challenge in the accurate processing of these signals.

In general, clutter, or components of return signals which are not of interest, can be attributed to both stationary and moving characteristics of a given background scene. Relatively stationary clutter sources include, for example, the ground, sea and various atmospheric conditions. Moving or Doppler-varying clutter sources may include precipitation as well as generally stationary objects comprising moving components. This clutter decreases radar performance by hindering the system's ability to detect targets and/or increases the probability of a false target detection.

Clutter may also comprise moving space borne objects such as decoys which likewise inhibit discrimination processes. A particular class of space borne clutter includes intentionally (or unintentionally) deployed countermeasures used by, for example, ballistic missiles. These countermeasures may be particularly challenging to ballistic missile defense (BMD) radars. In particular, the amount of radar cross-section (RCS) masking, as well as the density of countermeasure objects, can be made very great without large engineering costs. As a result, the use of these types of countermeasure systems has increased. An exemplary scenario illustrating the use of ballistic missile countermeasures is illustrated in FIG. 1. Intentional countermeasures 14 may be deployed at various stages of the flight of threat 10 by threat 10, including during exoatmospheric flight, where anti-missile activities by a BMD system are typically desirable. As set forth above, these counter measures 14 may inhibit BMD radars from discriminating, and thus accurately tracking and/or engaging, threat 10 in flight.

Several solutions have been implemented into radar signal processing systems in an effort to reduce clutter levels and improve system performance. For example, for stationary clutter, clutter mapping algorithms have been developed which create a background map and perform constant false alarm rate (CFAR) thresholding. More particularly, return signals may be received by an antenna, amplified, down-converted and passed through detector circuitry. These signals comprise desired return (e.g. target) data as well as components comprising unwanted power from clutter sources. CFAR processing attempts to determine a threshold power above which any return can be considered to originate from a target. This threshold is set typically to achieve a desired probability of a false alarm, or false alarm rate. As unwanted clutter and interference sources may have noise levels which change both spatially and temporally, a varying threshold may be used to maintain a generally constant probability of false alarm.

Moreover, a number of methods have also been implemented to remove moving clutter from radar returns. For example, a common method includes forming a track on suspected clutter as well as on objects of interest. Discrimination of the clutter from the lethal object is performed by identifying the objects of interest based on long-term behavioral characteristics, such as by using a Bayes network. This method, however, uses large amounts of radar resources to track the decoys or other objects of interest. Another method used is to filter the clutter and the object based on their radar cross-section (RCS). However, in challenging cases, the RCS of the threatening object may be smaller than many or most of the detected fragments, rendering bulk filtering based on RCS ineffective. Because these existing techniques may require tracking of the clutter, or otherwise require long processing times to discriminate the clutter from the objects of interest, the distribution of deployment velocities for the clutter may be such that they continue to complicate the radar scene throughout the exoatmospheric phase of flight, before finally being stripped away during the endoatmospheric re-entry phase. Accordingly, it is desirable to screen out a potentially large numbers of clutter objects, with few missed detections of the lethal object (low leakage), in order to concentrate focus of attention and expend radar resources on potentially threatening principal objects. In the case of a ballistic missile, if clutter generated in the exoatmosphere is not handled before re-entry, the terminal re-entry phase is the only remaining opportunity to perform discrimination, and this may not allow sufficient time to defend against the threat.

Improved systems and methods for clutter reduction, including intentional clutter resulting from the deployment of countermeasures, in radar systems are desired.

SUMMARY

In one embodiment of the present disclosure, a method for identification of one or more launched objects obscured by clutter is provided. The method includes the steps of transmitting one or more sensor pulses, receiving and processing the reflected return pulses. Objects of interest and their accelerations are identified based on a plurality of sensor returns. Objects exhibiting ballistic acceleration characteristics are identified as clutter objects, and objects exhibiting non-ballistic acceleration are characterized as one or more target objects.

In another embodiment of the present disclosure, a method for identification of one or more launched objects obscured by clutter is provided. The method comprises transmitting one or more sensor pulses to obtain a plurality of range-velocity sensor images. From these images, a range-velocity-acceleration image is generated. Objects in the range-velocity-acceleration image exhibiting ballistic acceleration are identified as clutter objects, and filtering of the clutter objects from the range-velocity-acceleration image is performed. From this filtering, one or more possible launched objects in the filtered range-velocity-acceleration image is revealed.

A method for suppressing clutter when detecting objects of interest in a radar system is also provided. The method includes defining a plurality of scatterer classes corresponding to a plurality of predetermined scatterer motion types. At least one of these classes corresponds to ballistic acceleration, and at least one of the classes corresponds to non-ballistic acceleration. A plurality of sensor pulses are transmitted, and their reflected returns received. Scatterers identified in the radar return signal are associated with one of the scatterer motion classes. A set of complex weights is generated, and applied to the radar return signal data to null scatterers associated with the class corresponding to ballistic acceleration.

In another embodiment of the present disclosure, a system for identifying one or more launched objects obscured by clutter is provided. The system comprises a sensor configured to transmit and receive one or more sensor pulses to obtain a plurality of range-velocity sensor images. A memory device is provided for storing the plurality of range-velocity images. A processor is provided and configured to: 1) cause the sensor to transmit the one or more sensor pulses to obtain the plurality of range-velocity sensor images, 2) generate a range-velocity-acceleration image from the plurality of range-velocity sensor images, 3) identify objects on the range-velocity-acceleration image exhibiting ballistic acceleration as clutter objects, and 4) identify objects on the range-velocity-acceleration image exhibiting non-ballistic acceleration as launched objects.

DETAILED DESCRIPTION

Figure 1:
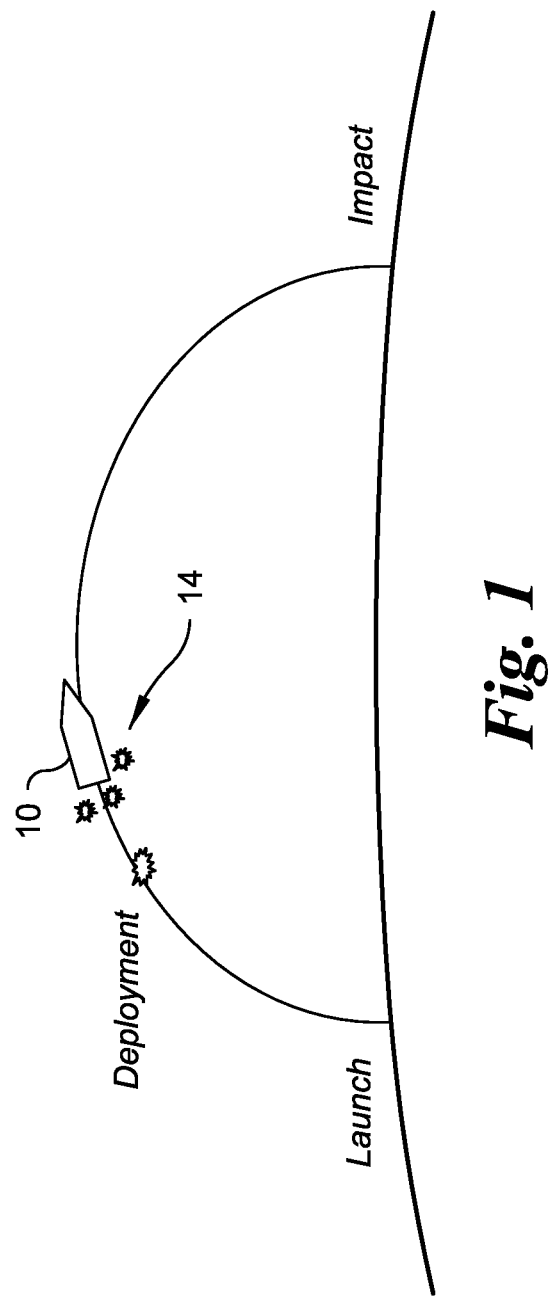
FIG. 1 is notional representation of a launched ballistic missile deploying intentional counter measures.

It is to be understood that the figures and descriptions of the present invention have been simplified to illustrate elements that are relevant for a clear understanding of the present invention, while eliminating, for purposes of clarity, many other elements found in typical remote sensing systems, including radar systems utilizing adaptive weight-based clutter nulling techniques. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

Clutter resulting, for example, from the deployment of countermeasures, often differ from a threatening object and other principal objects in a ballistic missile threat complex by virtue of ballistic vs. non-ballistic acceleration. More specifically, scatterers attached to long targets either tumbling or spinning exhibit instantaneous acceleration that differs greatly from the acceleration of gravity. Using this rationale, embodiments of the present disclosure include an adaptive technique working in an extended measurement space, including range acceleration, for deeply nulling scatterers that move ballistically, to mitigate the effectiveness of these countermeasure.

Figure 2:
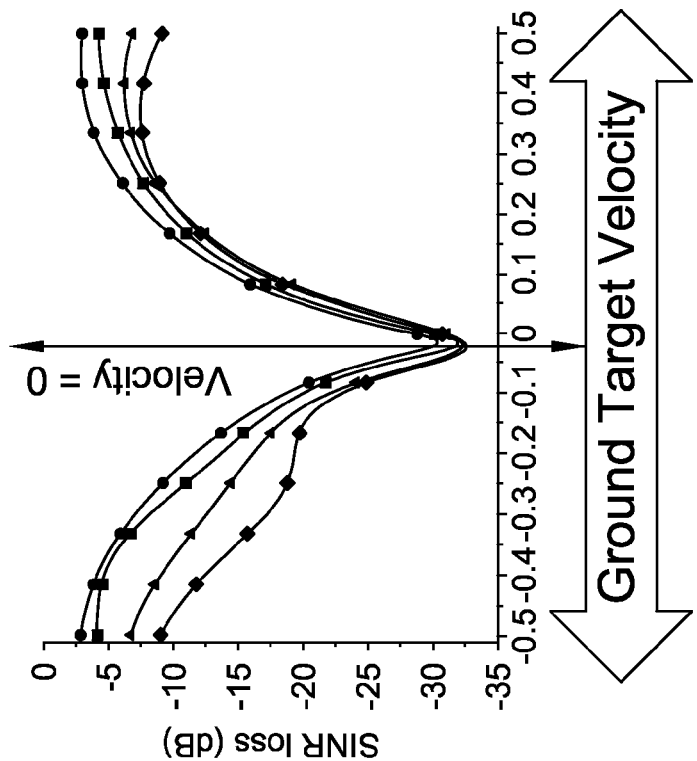
FIG. 2 is a graphical representation of stationary clutter nulling techniques according to the prior art.

Referring generally to FIG. 2, Space-Time Adaptive Processing (STAP) has traditionally been implemented to detect relatively small moving targets embedded in large quantities of stationary ground clutter. These schemes include combining adaptive weights with radar pulse data (corresponding via Fourier transform to Doppler shift). By means of adaptive weighting, it is possible to localize the stationary clutter in a compact region of the angle-Doppler space and deeply null this clutter, allowing improved detection of small moving targets that would otherwise have been obscured by the clutter or its range and Doppler sidelobes. These complex weights over the radar measurement dimensions are calculated based on the measured radar data, and are chosen to satisfy an optimum detection criterion that reduced to inverting a certain complex matrix formed from the radar data.

According to embodiments of the present disclosure, the use of adaptive weights over the radar measurement dimensions of pulse time, antenna receive element, and wideband frequency is extended to cover a much broader range of radar detection problems than what is utilized in current STAP-based systems. These problems include using adaptive weights over the measured radar data to enhance scatterers that follow one or more of predetermined classes of motions, while suppressing scatterers that exhibit motion not characterized in these one or more predetermined classes. These classes are defined in a generalized coordinate system appropriate to the application, and are defined according to a conditional probability density function in a path space.

In one implementation, this strategy of applying adaptive weighting over the degrees of freedom of a wideband range-Doppler pulse train is used to identify, and subsequently null clutter that moves ballistically (i.e. moves under the force of gravity alone), such as the above-described ballistic missile counter measures. It should be understood that the ballistic missile itself, when performing any maneuvers or deployments, leaves the ballistic state on account of the application of thrusts and torques. The purpose of the disclosure is to create an adaptive space-time nulling technique that creates a deep clutter notch, not for ground-stationary scatterers, but for these classes of clutter scatterers that move as though acted upon by gravity alone.

Figure 4:
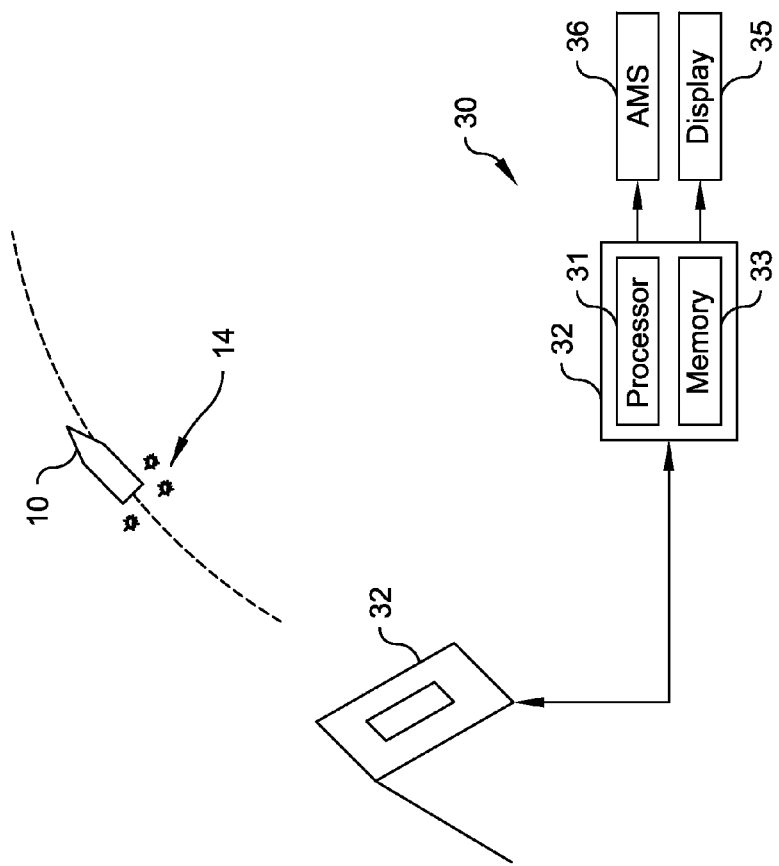
FIG. 4 is a simplified block diagram illustrating a radar system for performing embodiments of the clutter nulling techniques of the present disclosure.

FIG. 4 is a simplified block diagram illustrating a system useful for performing clutter suppression techniques according to embodiments of the present disclosure. Exemplary system 30 includes a sensor 32, such as a radar antenna array, a radar control computer 34, and an anti-missile system (AMS) 36. Radar control computer 34 may be used to process radar return data received by sensor 32, and to control transmission and reception operations of sensor 32. Control computer 34 may include one or more processors 31, one or more memory devices 33, and a display 35 for providing a visual form of processed radar data (e.g. discriminated targets) to a user. AMS 36 may be configured to receive processed radar data via a network or other communications connection such that radar computer 34 may transfer information concerning the location of one or more targets 10, as determined after clutter mitigation techniques according to embodiments of the present invention have been performed thereby, to AMS 36. AMS 36 may utilize this data for performing defensive operations against one or more identified targets.

While not illustrated for the purposes of brevity, it should be understood that system 30 may also include one or more transceivers and other components and related hardware associated with a radar system. For example, return signals from each transmitted radar pulse are subsequently captured and provided to at least one receiver or front-end module for signal demodulation. This receiver may include, by way of example only, processing components, including one or more filters, a low-noise amplifier and a down converter, as will be understood by one of ordinary skill in the art. At least one A/D converter may be provided for converting received analog return signals to digital form, including data representing I/Q components.

The basis for clutter detection and suppression techniques performed by system 30 are the use of predetermined, higher-order parametric models necessary to accurately categorize the phase histories of scatterers to be detected and suppressed. In general, a radar signal processing model can be any parametric model with some parameters, i.e., $\phi(f,t|q)$, where f is frequency, t is time, and q is the plurality of parameters necessary to specify the radar phase (see, for example, Eq. 1 below). In an example, a simplified parametric model can be represented by $\phi(f|r)$, where f is frequency and r is range. In a less simplified model, the parametric model can be represented by $\phi(f,t|x,v)$, where f is frequency, t is time, x is range, and v is velocity. An image may be formed in space consisting of all of the parameters of the model.

In one example of a higher-order model according to embodiments of the present disclosure, consider targets that accelerate linearly during the coherent pulse interval (CPI). Ballistic scatterers, for example, are those scatterers whose accelerations correspond to gravity. The acceleration of gravity at all points in inertial space is well known and characterized by a vector function g(r,t) of inertial position. A suitably general phase model is a quadratic phase corresponding to vector acceleration projected along the radar line of sight. The acceleration term may be incorporated into the parametric model. In an example, the scatterer is modeled as a point with constant velocity and constant acceleration throughout the coherent processing interval (CPI):

$$\phi(f, t | r, v, a) = \frac{4\pi f}{c}\left(r - vt - \frac{1}{2}at^2\right) \quad \text{Eq. 1}$$

This approach facilitates observations in a range-Doppler-acceleration space. For example, constant acceleration objects occupy a plane or narrow slab with normal parallel to the acceleration axis (in the far-field) at the component of gravitational acceleration parallel to the radar range vector. Doppler, correlated behavior, and acceleration characteristics (i.e. out-of plane accelerations), can allow separation of clutter and objects of interest in the attribute space. It should be understood that these higher-order models can be generated for classifying, and thus discriminating between, a variety of classes of motion, each having unique characteristics. Subsequent adaptive weighting creates a clutter notch in this three-dimensional path space, allowing clutter characteristics to be placed at a null in the power spectrum, thus minimizing clutter indications, while maximizing non-clutter power.

Figure 5:
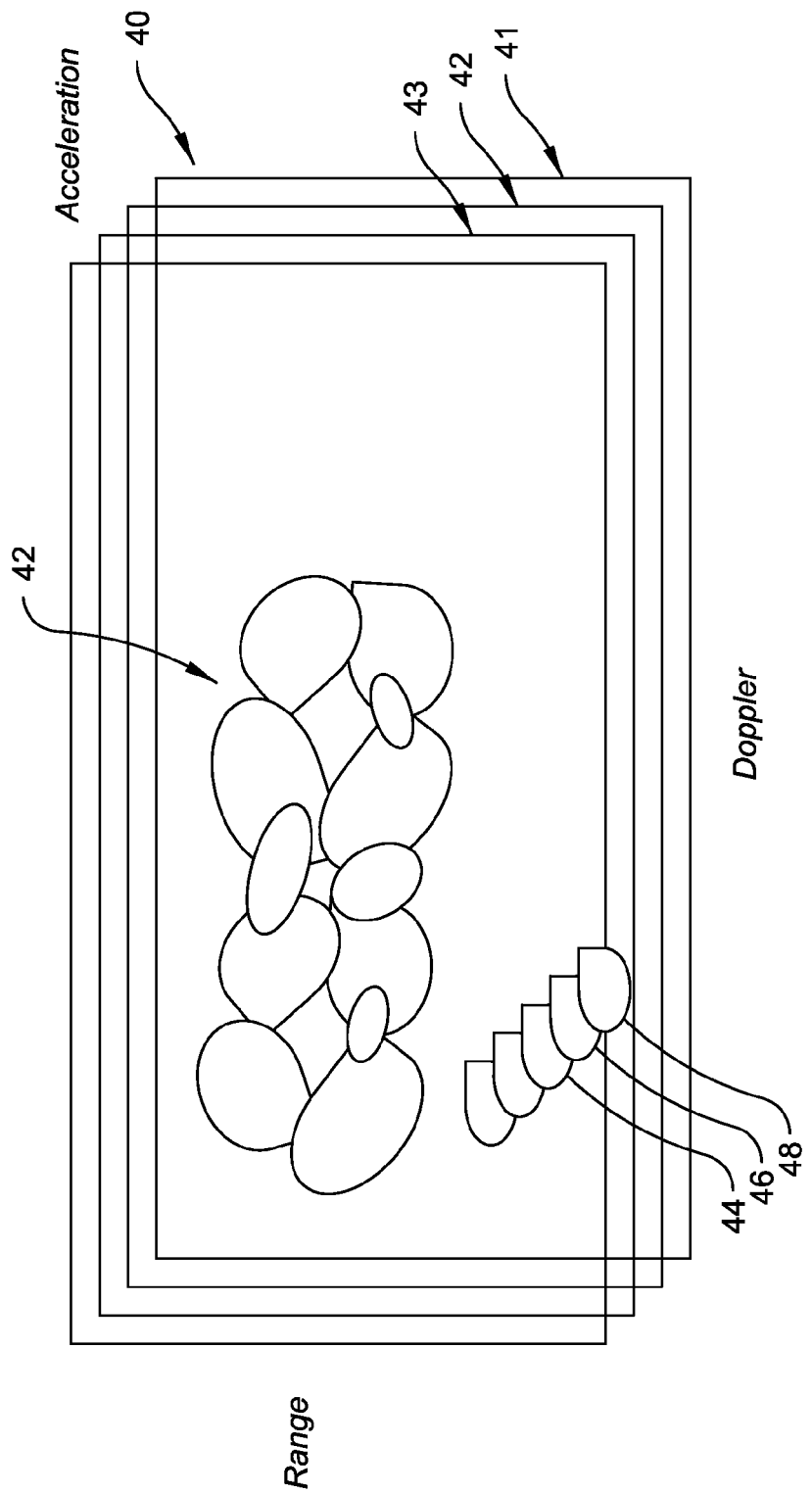
FIG. 5 is an exemplary range-velocity-acceleration image generated from a plurality of range-velocity images that may be observed by a radar system according to an embodiment of the present disclosure.
Figure 6:
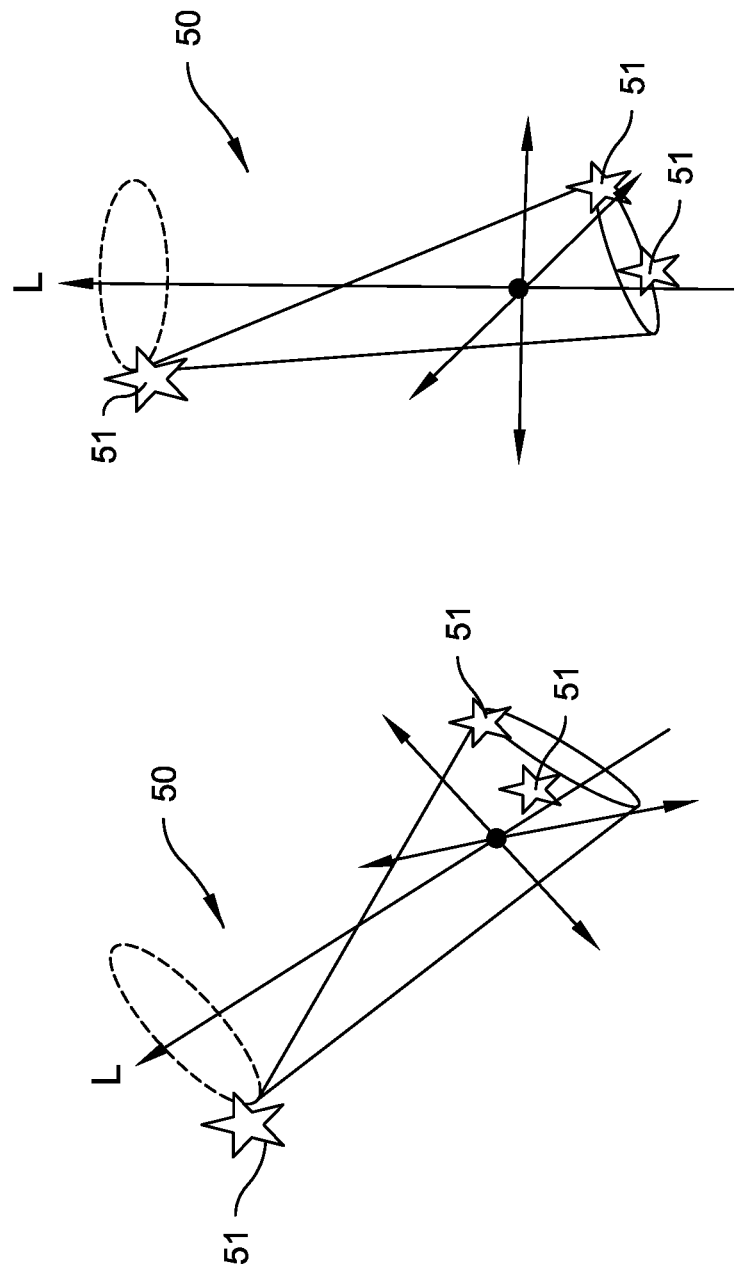
FIG. 6 is a notional depiction of a spinning or tumbling target.

Referring generally to FIG. 5, in an example, the above-described radar processing system may be used to generate a plurality of range-velocity images 41,43,45. From these images, a range-velocity-acceleration image I(r,v,a) 40 may be generated, depicting many exoatmospheric objects or particles and a target (e.g., a launched object) that is tumbling or in spin-precession embedded in the cloud formed by the objects and particles. As shown, FIG. 5 illustrates contours 42, which may represent clutter and/or target objects, resulting from received range/Doppler data. By analyzing successive return pulse data, acceleration of objects in the return data may be visualized. For example, objects 44,46,48 that exhibit centripetal acceleration can be seen. With reference to FIG. 6, an exemplary depiction of a spinning or tumbling target 50 is shown, in which the scatterers 51 are shown by a star symbol and the center of mass (CM). As illustrated, scatterers 51 at the tip and at the base of the target and not at the center of mass are subject to forces of rigid body constraint, that is, centripetal acceleration. Thus, the tip and base scatterers of the target do not move like free-falling particles. If the free fall objects or particles that do move like free-falling particles are filtered out, the tumbling object may be revealed.

Figure 7:
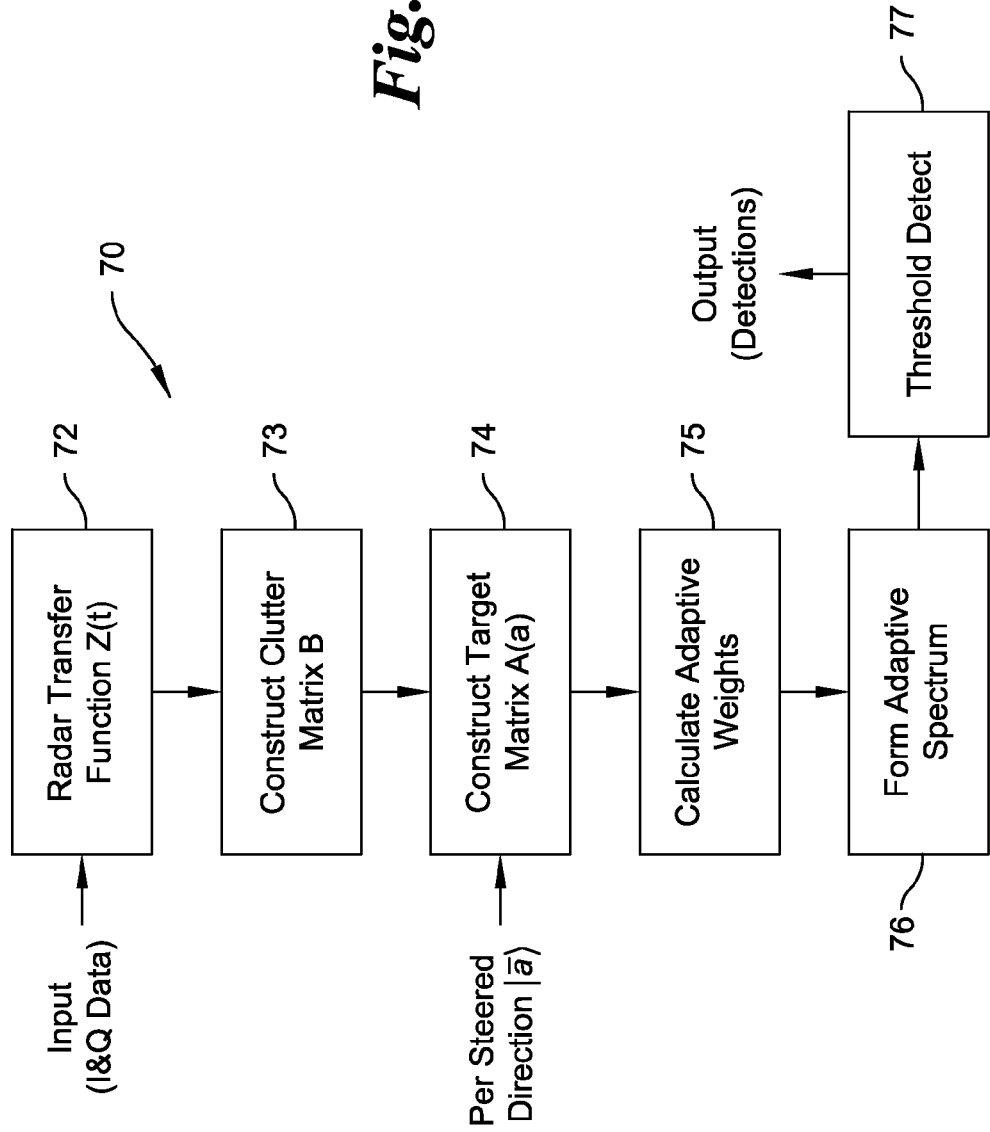
FIG. 7 is a simplified logic flow diagram illustrating clutter nulling techniques according to the present disclosure.

Referring generally to FIG. 7, an exemplary processing method 70 for performing the above-described operations will now be provided in greater detail. A narrowband or wideband radar signal consists of a sequence of pulses spaced at time interval Δt. As will be understood by one of ordinary skill in the art, the transmitted narrowband radar signal can be described as the coherent superposition of a sine wave and a cosine wave (I&Q) with a certain phase relationship. The reflected radar signal consists of the transmitted signal modified by an amplitude change and a phase change per radar pulse (called the linear transfer function of the reflection). See block 72. Writing this amplitude change and phase change in complex polar form for a given time interval t:

$$Z(t)=Ae^{i\phi}=I+iQ$$

with $$t=\{0,\Delta,2\Delta \ldots N\Delta\} \quad \text{Eq. 2}$$

The data to be processed to perform clutter notching in the algorithm is a vector of these complex numbers, one complex number per pulse time. The clutter to be removed from the signal consists of potentially large returns from objects of small size that are in a state of free fall. The scatterers to be detected are those like the ends of long tumbling objects that experience acceleration different from free fall.

In a first step of an exemplary process according to an embodiment of the present disclosure, a first phase difference is processed over the first time interval t. It will be assumed that the phase change of the signal is due to reflection from a uniformly accelerating scatterer. This model is valid as long as the time T=NΔ (coherent integration time) is sufficiently small. The coherent integration time is a system adjustable parameter. The complex number at each time step is modeled as:

$$Z(t|r, v, a) = Ae^{-\frac{4\pi f}{c}\left(r-vt-\frac{1}{2}at^2\right)} \qquad \text{Eq. 3}$$

with a resulting subsequent sequence:

$$Z'(t) = Z^*(t)Z(t+\Delta) \approx Ae^{+\frac{8\pi\Delta f}{c}(v+at)} \qquad \text{Eq. 4}$$

The new phase model represented herein considers that amplitude change is the same from one pulse to the next, which may be accurately modeled by making the pulse spacing $\Delta$ sufficiently short.

The second step in an exemplary process includes phase difference processing for a second sequence:

$$Z''(t|a) = Z'^*(t)Z'(t+\Delta) \approx Ae^{-\frac{8\pi\Delta^2 f}{c}at} \qquad \text{Eq. 5}$$

with an "acceleration spectrum" of the signal defined as:

$$\Phi(a) = \sum_t Z''(t|a) \qquad \text{Eq. 6}$$

$$I(a) = \Phi^*\Phi \qquad \text{Eq. 7}$$

The calculation of the acceleration spectrum from the second phase difference sequence is similar to the calculation of a Doppler (velocity) spectrum, as performed in current radar systems. As would be understood by one of ordinary skill in the art, this may be computed using a discrete Fourier transform (DFT) or a fast Fourier transform (FFT). The modified frequency is then:

$$f' = 2\Delta^2 f \qquad \text{Eq. 8}$$

The third step includes performing clutter nulling. This includes defining the probability that a particular target corresponds to a predetermined motion class associated with a target. The class conditional probability density corresponding to a target by:

$$p(a,\bar{a}|T) = \delta(a-\bar{a}) \qquad \text{Eq. 9}$$

This may also be determined via a sharply peaked distribution, such as:

$$p(a,\bar{a}|T) = \frac{1}{\sqrt{2\pi}\,\sigma_T} e^{-\frac{1}{2}\left(\frac{a-\bar{a}}{\sigma_T}\right)^2} \qquad \text{Eq. 10}$$

Next, the class conditional probability density corresponding to a clutter type is determined by:

$$p(a|C) = \frac{1}{\sqrt{2\pi}\,\sigma_C} e^{-\frac{1}{2}\left(\frac{a-g}{\sigma_c}\right)^2} \qquad \text{Eq. 11}$$

The elements of an acceleration steering vector may be defined by:

$$\langle t|a \rangle \equiv Z'(t)e^{-if'at} \qquad \text{Eq. 12}$$

Referring again to FIG. 7, in steps 73 and 74, respective matrices are constructed for both identified targets and identified clutter:

$$A(\bar{a}) = \int da|a\rangle p(a,\bar{a}|T)\langle a| \qquad \text{Eq. 13}$$

(target) and:

$$B = \int da|a\rangle p(a|C)\langle a| \qquad \text{Eq. 14}$$

(clutter).

In step 75, adaptive weights are calculated per steered acceleration according to:

$$|w(\bar{a})\rangle = B^{-1}A|\bar{a}\rangle \qquad \text{Eq. 15}$$

Figure 3:
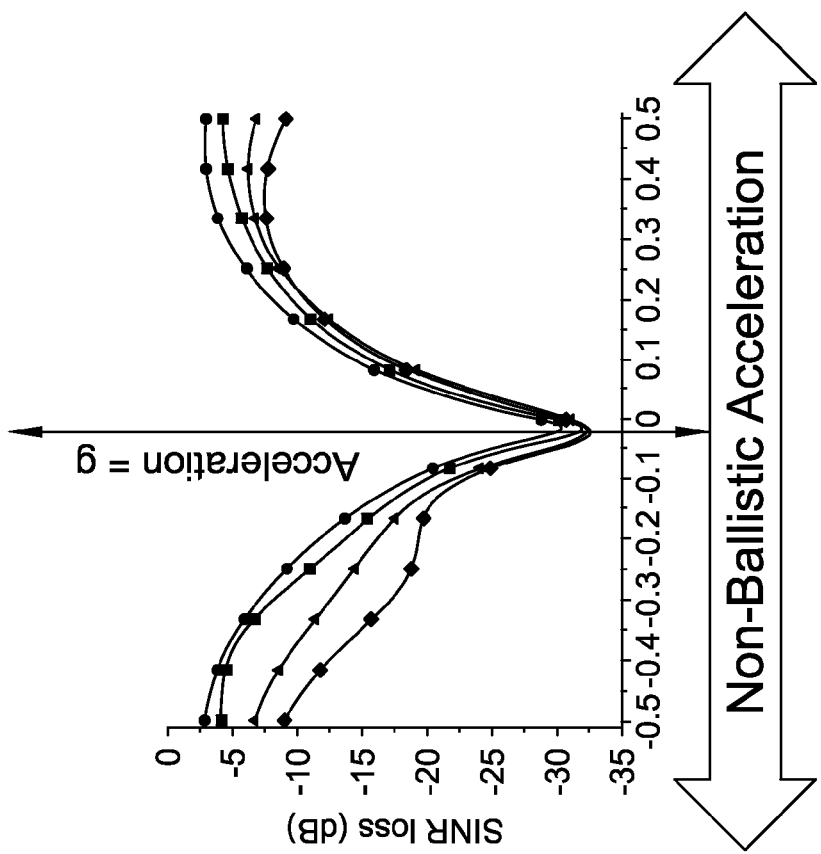
FIG. 3 is a graphical representation of clutter nulling or reduction techniques according to embodiments of the present disclosure.

The resulting complex digital weights may be generated by, for example, the above-described radar processing system 30. These weights are then applied to received radar data, and used to reduce the power of the identified clutter and/or interference, while maintaining gain in the areas comprising the non-clutter accelerations. This may be achieved by, for example, selectively altering the amplitude and/or phase of the return signals. The results of this weighting may be seen, for example, in FIG. 3, wherein objects displaying ballistic acceleration characteristics have been nulled via the above-described process.

Once the weights are applied in step 76, the adaptively nulled clutter spectrum is:

$$I(\bar{a}) = \langle w(\bar{a})|\bar{a}\rangle\langle\bar{a}|w(\bar{a})\rangle \qquad \text{Eq. 16}$$

Finally, for example, threshold CFAR detection in the adaptively nulled spectrum may be performed in step 77.

Figure 8:
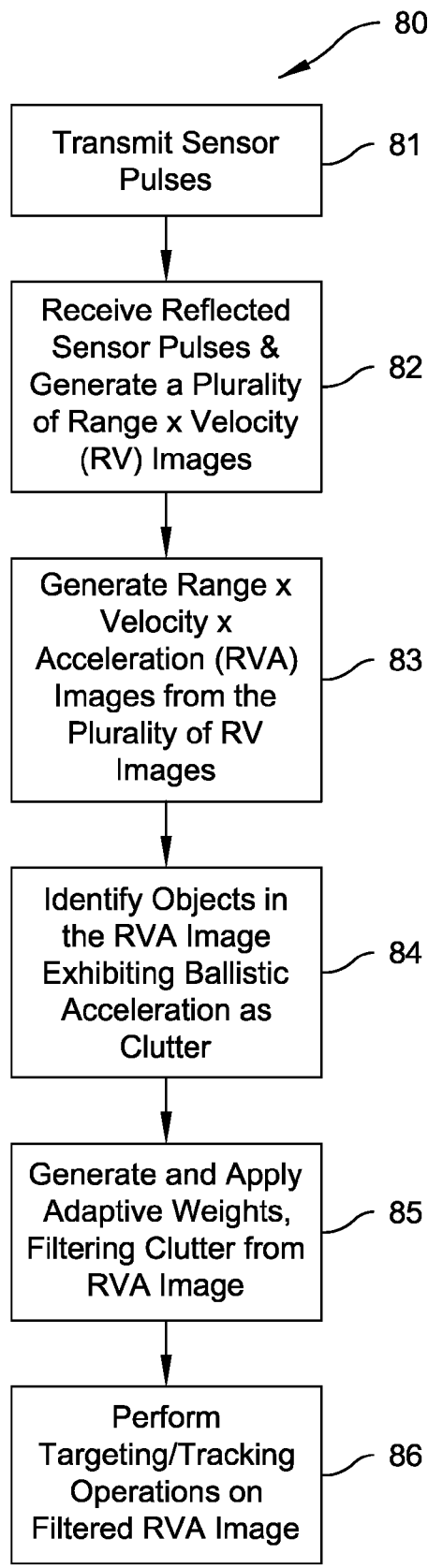
FIG. 8 is a simplified logic flow diagram illustrating a method of operation of a radar system according to the present disclosure.

Referring generally to FIG. 8, an exemplary method 80 of operating a radar system utilizing the above-described embodiments of the present disclosure is shown. In step 81, a radar system is used to transmit a plurality of sensor pulses. Scatterers reflect these pulses, which are received by the system, and used to generate a plurality of range-velocity images in step 82. A range-velocity-acceleration image is then generated from the plurality of range-velocity images in step 83. In step 84, objects in the range-velocity-acceleration image exhibiting ballistic acceleration are identified as being clutter objects. In step 85, these clutter objects are filtered from the range-velocity-acceleration image, thereby revealing one of more possible target objects within the filtered range-velocity-acceleration image. Subsequent targeting and/or tracking operations may be performed on the filtered range-velocity-acceleration image in step 86.

It should be understood that systems and methods of the present invention may be used to reduce or cancel unwanted signals in remote sensing systems of a variety of types, including sonar, radar, navigation and guidance systems.

The embodiments are provided by way of example only, and other embodiments for implementing the methods described herein may be contemplated by one of skill in the pertinent art without departing from the intended scope of this disclosure. For example, systems, including the radar processors described herein, may include memory containing data, which may include instructions, the instructions when executed by a processor or multiple processors, cause the steps of a method for performing the signal processing and weight creation set forth herein. Software may be embodied in a non-transitory machine readable medium upon which software instructions may be stored, the stored instructions when executed by a processor cause the processor to perform the steps of the methods described herein. Any suitable machine readable medium may be used, including but not limited to, magnetic or optical disks, for example CD-ROM, DVD-ROM, floppy disks and the like. Other media also fall within the intended scope of this disclosure, for example, dynamic random access memory (DRAM), random access memory (RAM), read-only memory (ROM) or flash memory may also be used.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A method for identification of one or more launched objects obscured by clutter, the method comprising:
    transmitting one or more sensor pulses;
    receiving reflected return pulses to obtain a plurality of sensor images;
    identifying objects based on the plurality of sensor images;
    determining acceleration characteristics for each of the identified objects based on the plurality of sensor images;
    designating objects exhibiting ballistic acceleration characteristics as clutter objects; and
    designating objects exhibiting non-ballistic acceleration characteristics as the one or more target objects.

2. The method of claim 1, wherein the plurality of sensor images comprise range-velocity images.

3. The method of claim 2, further comprising generating a range-velocity-acceleration image in addition to said range-velocity images.

4. The method of claim 3, wherein determining acceleration characteristics of each of the identified objects comprises determining the acceleration characteristics of each of the identified objects from the range-velocity-acceleration image.

5. The method of claim 4, further comprising generating a filtered range-velocity-acceleration image of the designated one or more target objects by filtering out the clutter objects from the range-velocity-acceleration image.

6. The method of claim 4, further comprising generating filtered sensor images of the designated one or more target objects by filtering out the designated clutter objects from each of the plurality of sensor images.

7. A method for identification of one or more launched objects obscured by clutter, comprising:
    transmitting one or more sensor pulses to obtain a plurality of range-velocity sensor images;
    generating a range-velocity-acceleration image from the plurality of range-velocity sensor images;
    identifying objects in the range-velocity-acceleration image exhibiting ballistic acceleration as clutter objects;
    filtering the clutter objects from the range-velocity-acceleration image, thereby revealing one or more possible launched objects in the filtered range-velocity-acceleration image.

8. The method of claim 7, further comprising
    determining which of the one or more possible launched objects exhibit non-ballistic acceleration; and
    identifying the one or more possible launched objects exhibiting non-ballistic acceleration as launched objects.

9. The method of claim 8, further comprising generating a filtered range-velocity-acceleration image of the identified launched by filtering out the identified clutter objects from the range-velocity-acceleration image.

10. The method of claim 7, further comprising generating filtered sensor images of the identified launched objects by filtering out the designated clutter objects from each of the plurality of sensor images.

11. A system for identifying one or more launched objects obscured by clutter,
    the system comprising:
    a sensor configured to transmit and receive one or more sensor pulses to obtain a plurality of range-velocity sensor images;
    memory for storing the plurality of range-velocity images; and
    a processor configured to:
        cause the sensor to transmit the one or more sensor pulses to obtain the plurality of range-velocity sensor images;
        generate a range-velocity-acceleration image from the plurality of range-velocity sensor images;
        identify objects in the range-velocity-acceleration image exhibiting ballistic acceleration as clutter objects; and
        identify objects in the range-velocity-acceleration image exhibiting non-ballistic acceleration as launched objects.

12. The system of claim 11, wherein the processor is further configured to generate a filtered range-velocity-acceleration image of the identified launched objects by filtering out the identified clutter objects from the range-velocity-acceleration image.

13. The system of claim 12, further comprising a display coupled to the processor, wherein the processor is further configured to cause the filtered range-velocity-acceleration image to be shown on the display.

14. The system of claim 11, further comprising a communications network coupling the processor to an anti-missile defense system, wherein said processor is further configured to transmit tracking data relating to the designated launched objects to the anti-missile defense system via the communications network.

15. A method for suppressing clutter when detecting objects of interest in a radar system, comprising:
    defining a plurality of scatterer classes corresponding to a plurality of predetermined scatterer motion types, at least one of the classes corresponding to ballistic acceleration, and at least one of the classes corresponding to non-ballistic acceleration;

transmitting a plurality of sensor pulses;

receiving reflected return pulses from the transmitted pulses;

associating scatterers identified in the radar return signal with one of the scatterer classes;

generating a set of complex weights;

applying the generated complex weights to the radar return signal data to null scatterers associated with the class corresponding to ballistic acceleration.

16. The method of claim 15, wherein the plurality of scatterer classes are predefined by a plurality of parametric models and are stored into a memory device.

* * * * *